No. 638,560.  
W. CHESTERSON.  
PNEUMATIC STACKER.  
(Application filed May 9, 1898.)  
Patented Dec. 5, 1899.

(No Model.)

WITNESSES:  
E. S. Frye.  
J. A. Walsh.

INVENTOR  
William Chesterson.  
BY Chester Bradford,  
ATTORNEY.

UNITED STATES PATENT OFFICE.

WILLIAM CHESTERSON, OF CRAWFORDSVILLE, INDIANA, ASSIGNOR TO THE INDIANA MANUFACTURING COMPANY, OF INDIANAPOLIS, INDIANA.

PNEUMATIC STACKER.

SPECIFICATION forming part of Letters Patent No. 638,560, dated December 5, 1899.

Application filed May 9, 1898. Serial No. 680,158. (No model.)

*To all whom it may concern:*

Be it known that I, WILLIAM CHESTERSON, a citizen of the United States, residing at Crawfordsville, in the county of Montgomery and State of Indiana, have invented certain new and useful Improvements in Pneumatic Stackers, of which the following is a specification.

My said invention consists in certain improvements upon that class of machines known as "pneumatic stackers" whereby the construction is simplified and the operation is improved. Said invention will be first fully described, and the novel features thereof then pointed out in the claims.

Figure 1:
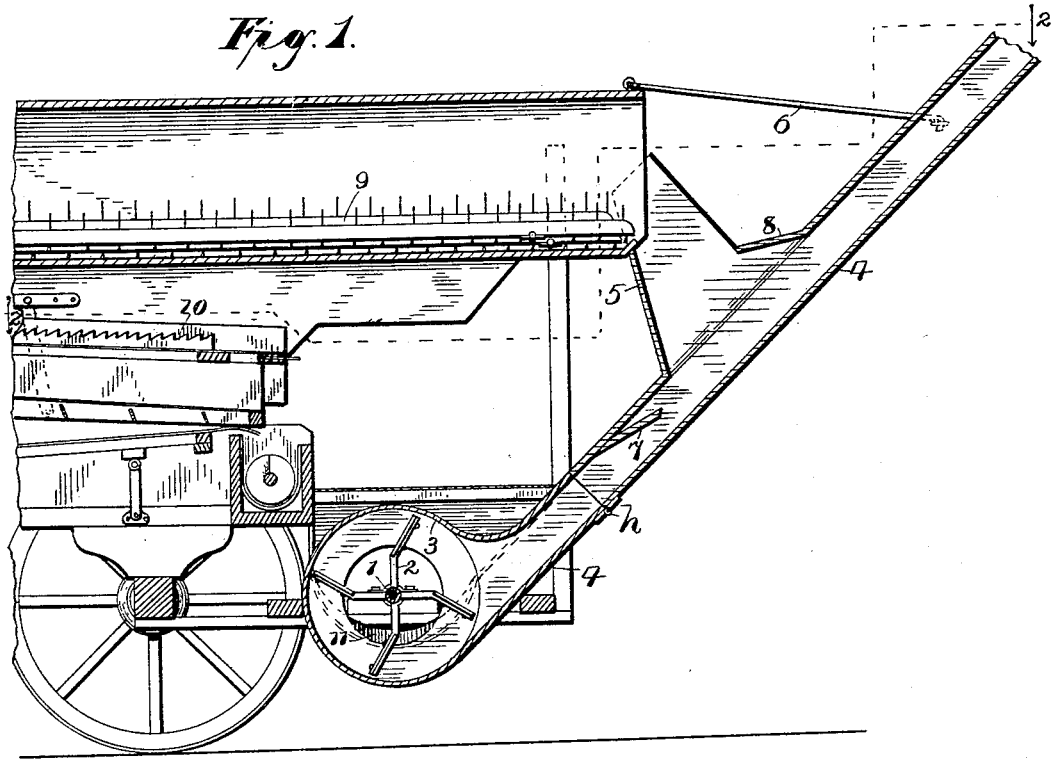
Figure 2:
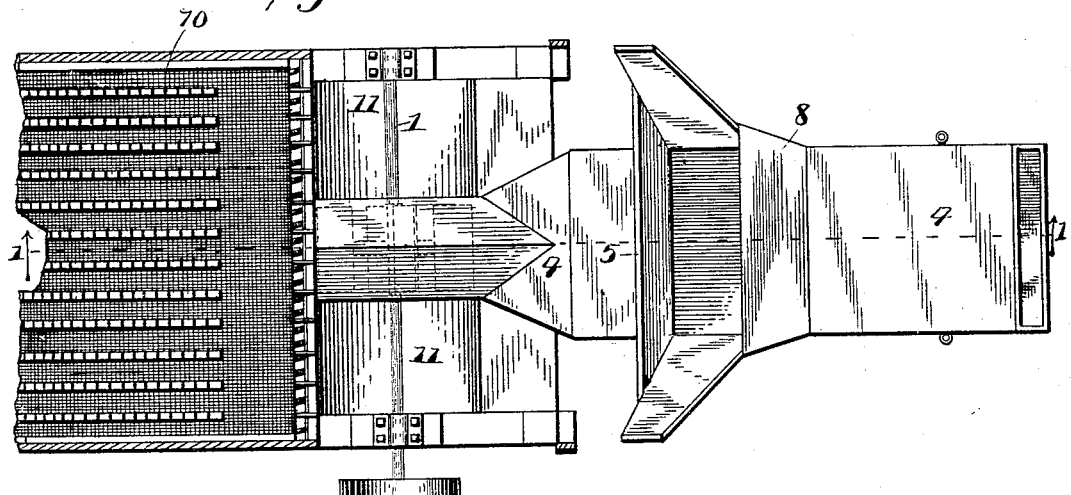

Referring to the accompanying drawings, which are made a part hereof and on which similar letters and numerals of reference indicate similar parts, Figure 1 is a central vertical sectional view of the rear end of a separator, clover-huller, or such like machine provided with a pneumatic stacker embodying my present invention as seen from the dotted line 1 1 in Fig. 2; and Fig. 2 is a horizontal sectional view as seen from the dotted line 2 2 in Fig. 1.

The construction and operation of the separator or huller, generally speaking, may be any desired and need not therefore be particularly described herein.

Upon a shaft 1 in the rear end of such a machine is mounted a blast-fan 2, situated within a suitable housing 3, and from this housing leads tangentially a trunk or chute 4. Upon the upper side of this trunk or chute, at a suitable point, is situated a branch 5, which extends up to behind that point of the separator where the straw or other threshed product is discharged, whereby the same is guided down into said trunk or chute. Said trunk or chute is preferably divided, with the parts hinged, as at *h*. Supporting-rods 6 carry the outer or hinged portion thereof when it is in position for use. When it is desired to have convenient access to the rear end of the machine, it is easily obtained by unhooking these rods 6 and allowing the trunk or chute to drop down and rest upon the ground or upon any suitable support which may be provided. Within the trunk or chute 4 and just in front of the receiving branch 5 is an inclined cut-off 7, which extends from the upper side of said trunk or chute down to about midway thereof, its lower or outer end terminating just in front of the opening into the branch 5. This device I have found in practice to be a very valuable feature in a machine of this character. It serves to compress the air as it passes from the fan, so that it will emerge into the space beyond said cut-off with increased force. At the same time it protects the straw or other threshed material at the immediate point where it enters the trunk or chute from the force of said blast, so that said material may pass into said trunk or chute more freely. As the air-blast passes said cut-off 7 it expands somewhat; but the trunk or chute beyond that point being filled with the straw or other material the pressure is maintained more nearly uniform throughout than it would otherwise be. In other words, the air and the material being driven thereby occupy the larger space beyond said cut-off, so as to preserve about the same pressure as the air alone exerts at the point of discharge.

The operation of this apparatus is aided by the peculiar form of the branch 5, through which the material enters the trunk or chute. Instead of being of the usual hopper-like form it, as will be noticed, grows larger as it approaches the point of union, and upon the side thereof which is farthest from the cut-off 7 is a member 8, whose inclination is such as to aid materially in delivering the straw or other material into the trunk or chute. The upper edge of this member 8 is sufficiently above the path of the air-blast traveling through the chute 4 to permit the straw to pass below it, and its direction of inclination is such as to cause the straw to be drawn easily into said chute after it passes below said upper edge, as will be readily understood.

The operation is as follows: The machine being in operation, the straw-carrier floors 9 convey the straw, clover, or other material being threshed to the branch 5, into which it falls and through which it is delivered to the trunk or chute 4. The chaff is driven over the riddles 10 and falls down alongside the fan-housing 3. At this point it comes in contact with concave and inclined floor parts 11, which are alongside said fan-housing and lead to the eyes thereof and which convey and guide the chaff into said fan-eyes. The ordinary operation of the fan 2 draws in a supply of air through the eyes and with such air the said chaff and propels the same out the trunk or chute 4 and past the cut-off 7. Here the air and chaff come in contact with the straw or other threshed material, and the whole is forced on out through said trunk or chute and delivered onto the stack.

Having thus fully described my said invention, what I claim as new, and desire to secure by Letters Patent, is—

1. The combination, in a pneumatic stacker, of the fan, the fan-housing, a concave and inclined floor to receive the chaff and guide the same into the eyes of said fan-housing, the trunk or chute leading out from said fan-housing, said trunk or chute having an opening in one side through which the straw or other material from the separator may be introduced, and a cut-off in said trunk or chute located just in front of said opening whereby the front side of said opening is protected from the effects of the blast and the entrance of the material thus aided, the trunk or chute beyond said opening being thus proportioned to better accommodate said blast and said material, substantially as set forth.

2. The combination, in a pneumatic stacker, of the fan, the fan-housing, the discharging trunk or chute having an opening to receive the material to be stacked, and a branch from said trunk or chute joined thereto over said opening, the lower end whereof is the largest, the upper end being inclined to a point behind the straw-delivery floors of the separator, substantially as set forth.

3. The combination, in a pneumatic stacker, of the fan, the fan-housing, a trunk or chute leading off tangentially from said fan-housing, an inclined receiving branch on said trunk or chute the larger end whereof is joined thereto, and a cut-off 7 in front of said branch.

4. The combination, in a pneumatic stacker, the fan, the fan-housing, the trunk or chute leading tangentially therefrom, a branch 5 joined to said trunk or chute through which to receive the material to be stacked, said branch having on the side farthest from the fan a part 8 inclined more sharply toward the discharging end thereof.

5. The combination, in a pneumatic stacker, of the fan, the fan-casing, the trunk or chute leading therefrom, a receiving branch to said trunk or chute located on the upper side thereof and leading thence to behind the straw-delivery floor of the separator, and provided with a sharply-inclined part 8 for guiding the material toward the delivery end of said trunk or chute, and a cut-off 7 situated in said trunk or chute behind the said branch, said several parts being constructed, arranged and operating substantially as set forth.

In witness whereof I have hereunto set my hand and seal, at Crawfordsville, Indiana, this 30th day of April, A. D. 1898.

WILLIAM CHESTERSON. [L. S.]

Witnesses:
ALBERT D. THOMAS,
DAISY EDGE.